(12) United States Patent
Raghavan et al.

(10) Patent No.: US 11,909,463 B2
(45) Date of Patent: Feb. 20, 2024

(54) INTER-BEAM PHASE FACTOR TRACKING

(71) Applicant: QUALCOMM Incorporated, San Diego, CA (US)

(72) Inventors: Vasanthan Raghavan, West Windsor Township, NJ (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 16/949,904

(22) Filed: Nov. 19, 2020

(65) Prior Publication Data

US 2021/0159947 A1    May 27, 2021

Related U.S. Application Data

(60) Provisional application No. 62/941,574, filed on Nov. 27, 2019.

(51) Int. Cl.
*H04B 7/0408* (2017.01)
*H04B 7/08* (2006.01)
(Continued)

(52) U.S. Cl.
CPC ......... *H04B 7/0408* (2013.01); *H04B 7/0885* (2013.01); *H04L 5/0051* (2013.01); *H04W 72/044* (2013.01); *H04W 72/23* (2023.01)

(58) Field of Classification Search
CPC .... H04B 7/0408; H04B 7/0885; H04B 7/063; H04B 7/0617; H04B 7/024; H04L 5/0051;
(Continued)

(56) References Cited

U.S. PATENT DOCUMENTS

2005/0047384 A1* 3/2005 Wax ..................... H04W 72/046
455/561
2014/0105054 A1* 4/2014 Sægrov ..................... G01S 5/12
370/252

(Continued)

FOREIGN PATENT DOCUMENTS

| CN | 108881091 A | 11/2018 |
| CN | 109217993 A | 1/2019 |
| WO | 2019195171 A1 | 10/2019 |

OTHER PUBLICATIONS

International Search Report and Written Opinion—PCT/US2020/061601—ISA/EPO—Mar. 1, 2021.

*Primary Examiner* — Kabir A Timory
(74) *Attorney, Agent, or Firm* — Harrity & Harrity, LLP

(57) ABSTRACT

Various aspects of the present disclosure generally relate to wireless communication. In some aspects, a wireless communication device may receive, from a base station (BS), an indication of an inter-beam phase factor tracking reference signal configuration for inter-beam phase factor tracking, wherein at least one of the wireless communication device or the BS performs multi-beam combining over at least two static directions or beams from one or more antenna panels. The wireless communication device may perform one or more measurements of an inter-beam phase factor tracking reference signal based at least in part on the inter-beam phase factor tracking reference signal configuration. Numerous other aspects are provided.

30 Claims, 16 Drawing Sheets

(51) Int. Cl.
*H04L 5/00* (2006.01)
*H04W 72/044* (2023.01)
*H04W 72/23* (2023.01)

(58) Field of Classification Search
CPC ..... H04L 5/005; H04L 5/0053; H04L 5/0023; H04W 72/042; H04W 72/044
See application file for complete search history.

(56) References Cited

U.S. PATENT DOCUMENTS

| | | |
|---|---|---|
| 2019/0132827 A1 | 5/2019 | Kundargi et al. |
| 2019/0149295 A1* | 5/2019 | Wang .................. H04L 5/0042 370/336 |
| 2019/0253106 A1 | 8/2019 | Raghavan et al. |
| 2020/0007369 A1* | 1/2020 | Ciochina-Duchesne .................... H04L 27/2636 |

* cited by examiner

INTER-BEAM PHASE FACTOR TRACKING

CROSS-REFERENCE TO RELATED APPLICATION

This Patent Application claims priority to U.S. Provisional Patent Application No. 62/941,574, filed on Nov. 27, 2019, and entitled "INTER-BEAM PHASE FACTOR TRACKING." The disclosure of the prior Application is considered part of and is incorporated by reference into this Patent Application.

FIELD OF THE DISCLOSURE

Aspects of the present disclosure generally relate to wireless communication and to techniques and apparatuses for inter-beam phase factor tracking.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include receiving, from a base station (BS), an indication of an inter-beam phase factor tracking reference signal configuration for inter-beam phase factor tracking, wherein at least one of the wireless communication device or the BS performs multi-beam combining over at least two static directions or beams from one or more antenna panels; and performing one or more measurements of an inter-beam phase factor tracking reference signal based at least in part on the inter-beam phase factor tracking reference signal configuration.

In some aspects, a method of wireless communication, performed by a BS, may include configuring an inter-beam phase factor tracking reference signal configuration for inter-beam phase factor tracking, wherein at least one of a user equipment (UE) or the BS performs multi-beam combining over at least two static directions or beams from one or more antenna panels; and transmitting, to the UE, an indication of the inter-beam phase factor tracking reference signal configuration.

In some aspects, a wireless communication device for wireless communication may include memory and one or more processors operatively coupled to the memory. The memory and the one or more processors may be configured to receive, from a BS, an indication of an inter-beam phase factor tracking reference signal configuration for inter-beam phase factor tracking, wherein at least one of the wireless communication device or the BS performs multi-beam combining over at least two static directions or beams from one or more antenna panels; and perform one or more measurements of an inter-beam phase factor tracking reference signal based at least in part on the inter-beam phase factor tracking reference signal configuration.

In some aspects, a BS for wireless communication may include memory and one or more processors operatively coupled to the memory. The memory and the one or more processors may be configured to configure an inter-beam phase factor tracking reference signal configuration for inter-beam phase factor tracking, wherein at least one of a UE or the BS performs multi-beam combining over at least two static directions or beams from one or more antenna panels; and transmit, to the UE, an indication of the inter-beam phase factor tracking reference signal configuration.

In some aspects, a non-transitory computer-readable medium may store one or more instructions for wireless communication. The one or more instructions, when executed by one or more processors of a wireless communication device, may cause the one or more processors to: receive, from a BS, an indication of an inter-beam phase factor tracking reference signal configuration for inter-beam phase factor tracking, wherein at least one of the wireless communication device or the BS performs multi-beam combining over at least two static directions or beams from one or more antenna panels; and perform one or more measurements of an inter-beam phase factor tracking reference signal based at least in part on the inter-beam phase factor tracking reference signal configuration.

In some aspects, a non-transitory computer-readable medium may store one or more instructions for wireless communication. The one or more instructions, when executed by one or more processors of a BS, may cause the one or more processors to: configure an inter-beam phase factor tracking reference signal configuration for inter-beam phase factor tracking, wherein at least one of a UE or the BS performs multi-beam combining over at least two static directions or beams from one or more antenna panels; and transmit, to the UE, an indication of the inter-beam phase factor tracking reference signal configuration.

In some aspects, an apparatus for wireless communication may include means for receiving, from a BS, an indication of an inter-beam phase factor tracking reference signal configuration for inter-beam phase factor tracking, wherein at least one of the apparatus or the BS performs multi-beam combining over at least two static directions or beams from one or more antenna panels; and means for performing one or more measurements of an inter-beam phase factor tracking reference signal based at least in part on the inter-beam phase factor tracking reference signal configuration.

In some aspects, an apparatus for wireless communication may include means for configuring an inter-beam phase factor tracking reference signal configuration for inter-beam phase factor tracking, wherein at least one of a UE or the apparatus performs multi-beam combining over at least two static directions or beams from one or more antenna panels; and means for transmitting, to the UE, an indication of the inter-beam phase factor tracking reference signal configuration.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements").

These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
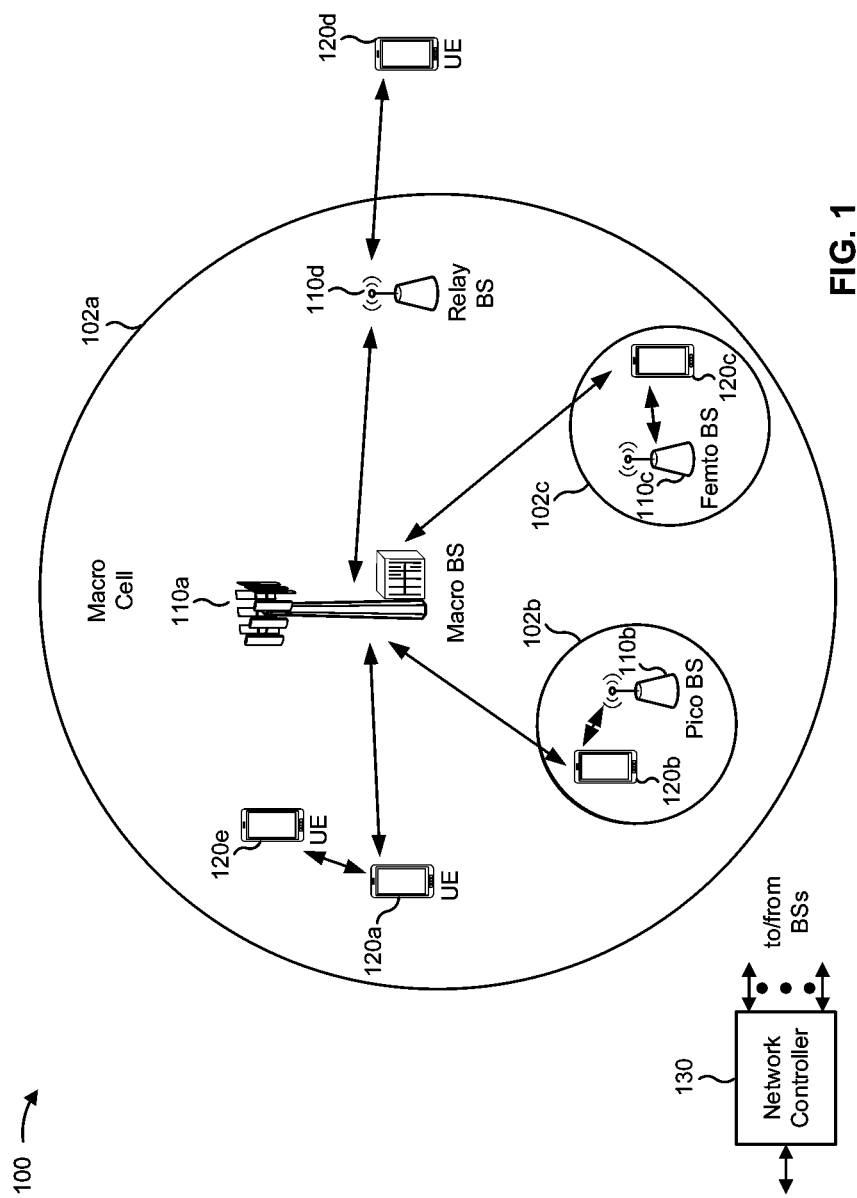
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
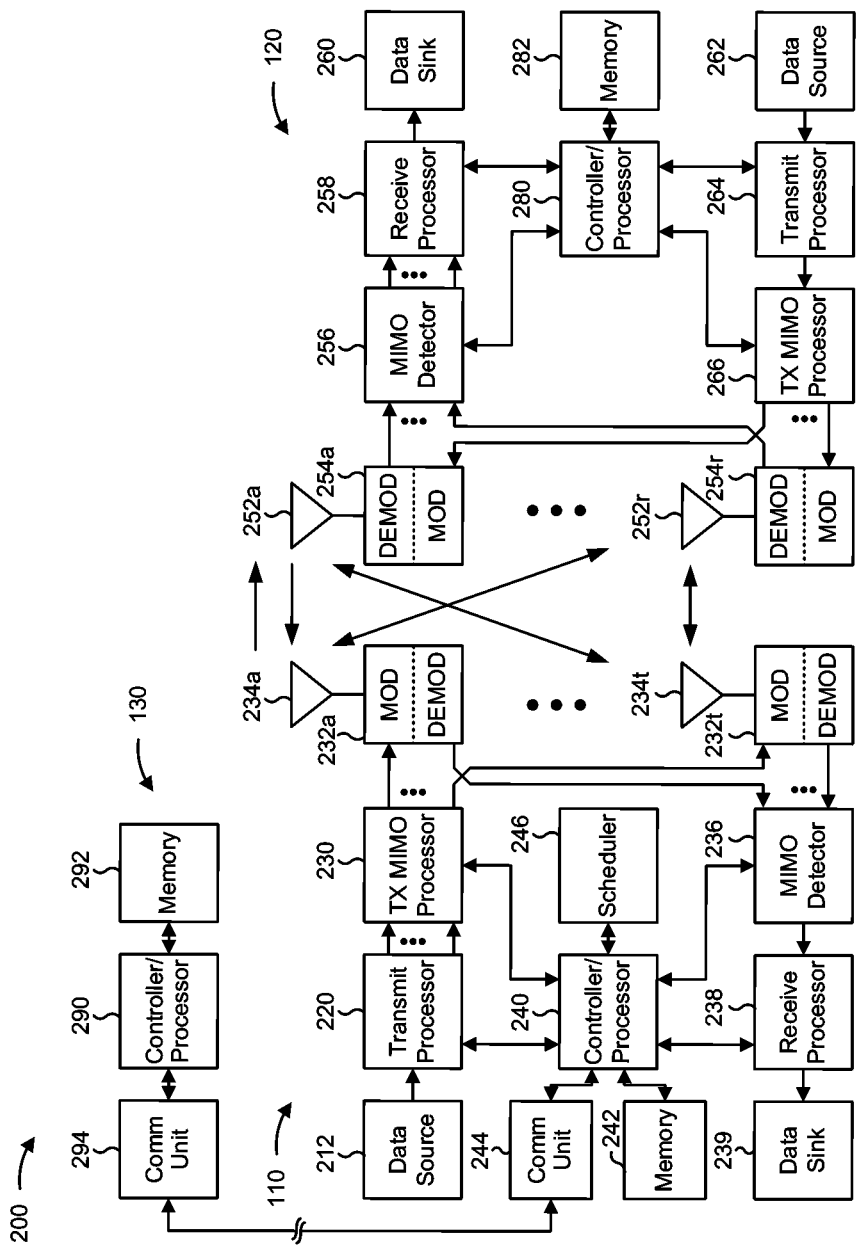
FIG. 2 is a block diagram illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with inter-beam phase factor tracking, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for receiving, from a BS 110, an indication of an inter-beam phase factor tracking reference signal configuration for inter-beam phase factor tracking, wherein at least one of the UE 120 or the BS 110 performs multi-beam combining over at least two static directions or beams from one or more antenna panels, means for performing one or more measurements of an inter-beam phase factor tracking reference signal based at least in part on the inter-beam phase factor tracking reference signal configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, BS 110 may include means for receiving, from another BS 110, an indication of an inter-beam phase factor tracking reference signal configuration for inter-beam phase factor tracking, wherein at least one of the BS 110 or the other BS 110 performs multi-beam combining over at least two static directions or beams from one or more antenna panels, means for performing one or more measurements of an inter-beam phase factor tracking reference signal based at least in part on the inter-beam phase factor tracking reference signal configuration, and/or the like. In some aspects, BS 110 may include means for configuring an inter-beam phase factor tracking reference signal configuration for inter-beam phase factor tracking, wherein at least one of a UE 120 or the BS 110 performs multi-beam combining over at least two static directions or beams from one or more antenna panels, means for transmitting, to the UE 120, an indication of the inter-beam phase factor tracking reference signal configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
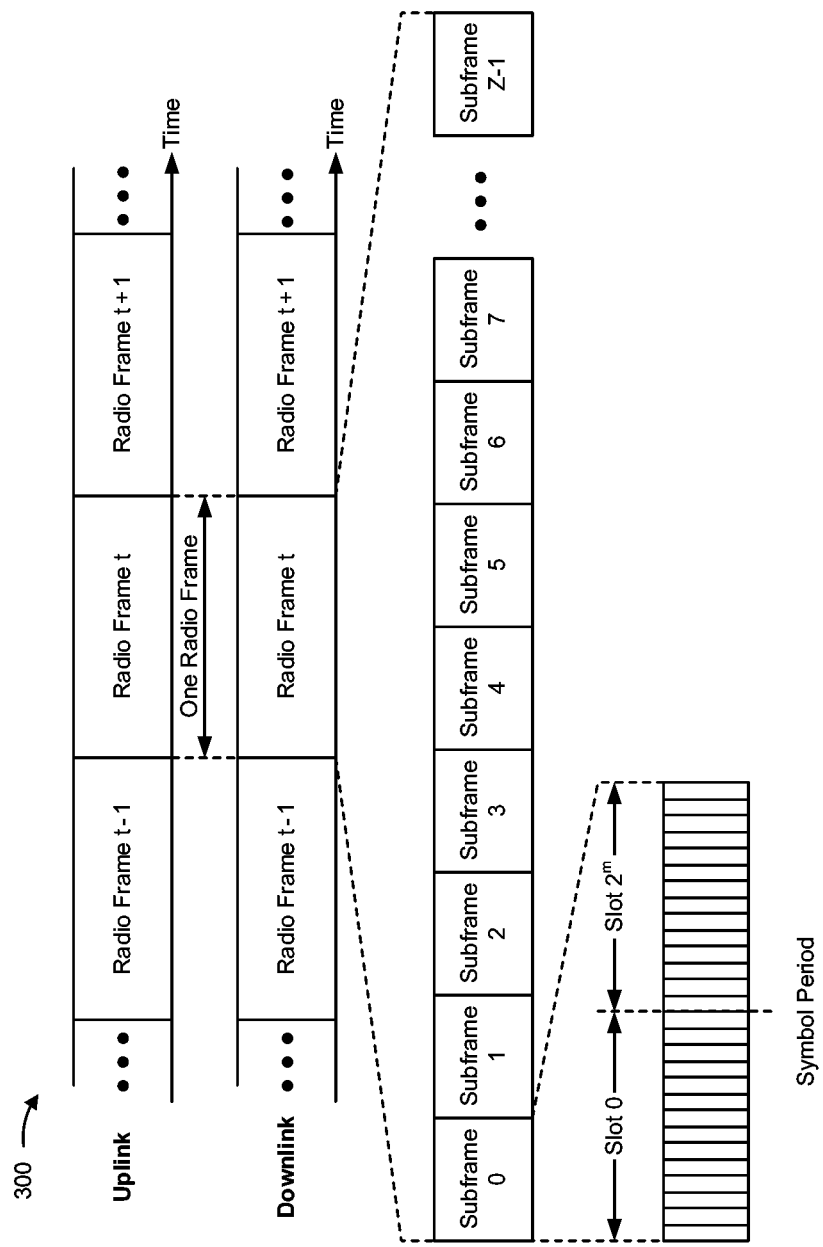
FIG. 3A is a block diagram illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
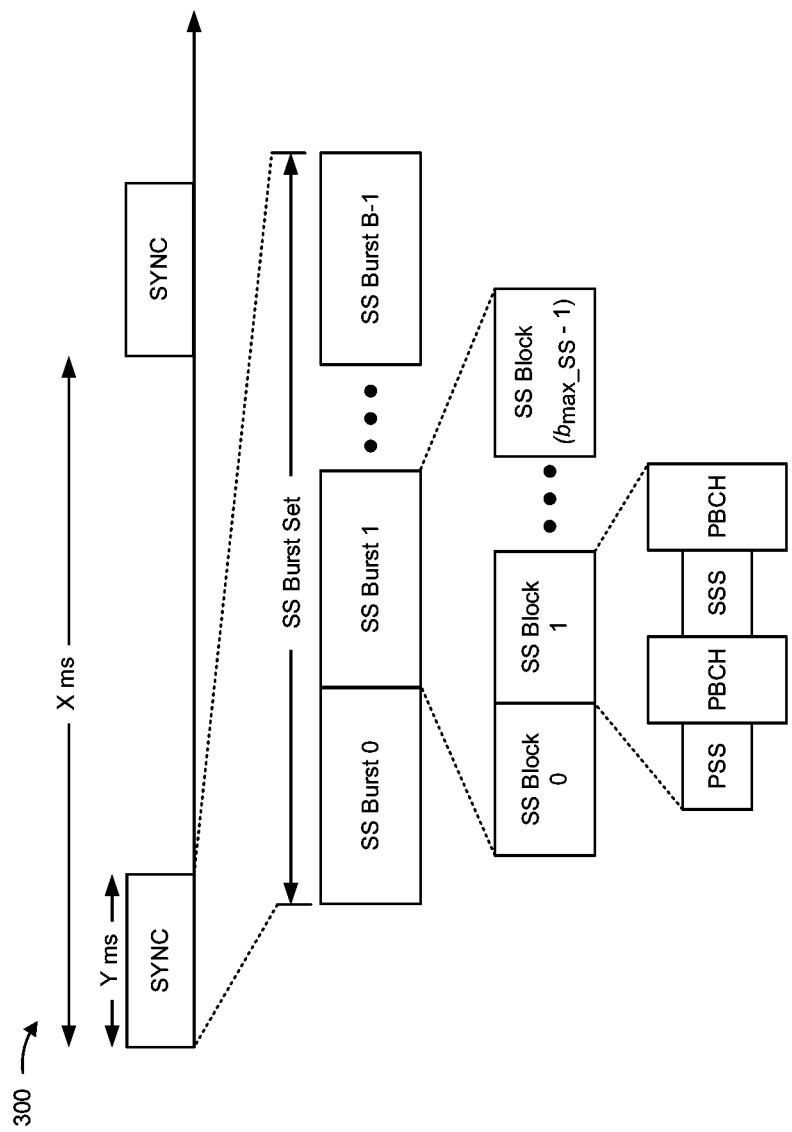
FIG. 3B is a block diagram illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$-1), where $b_{max\_SS}$-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
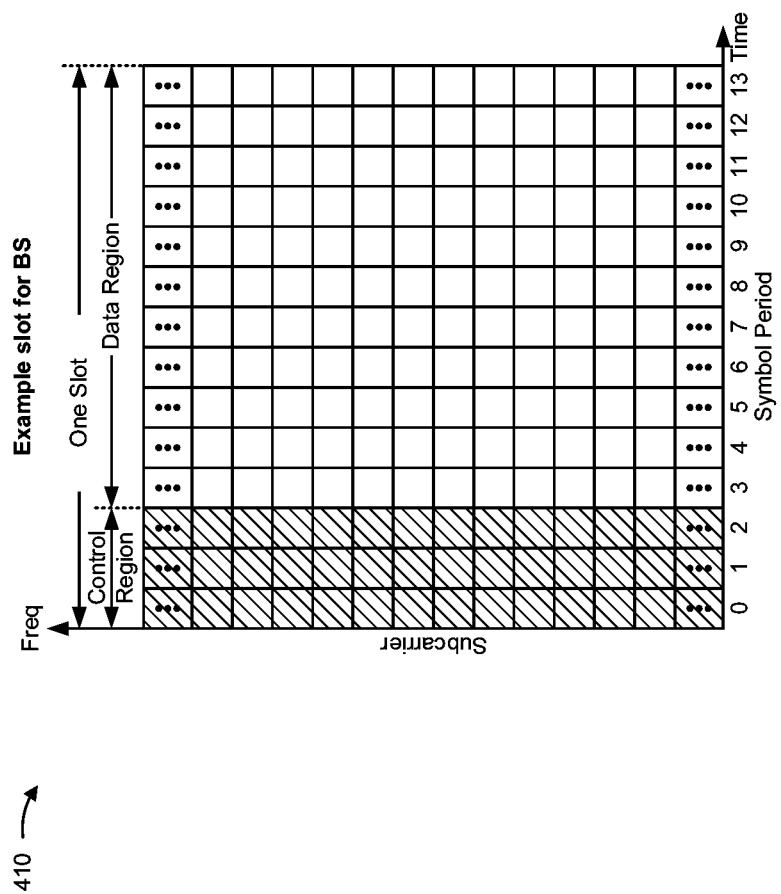
FIG. 4 is a block diagram illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported, and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
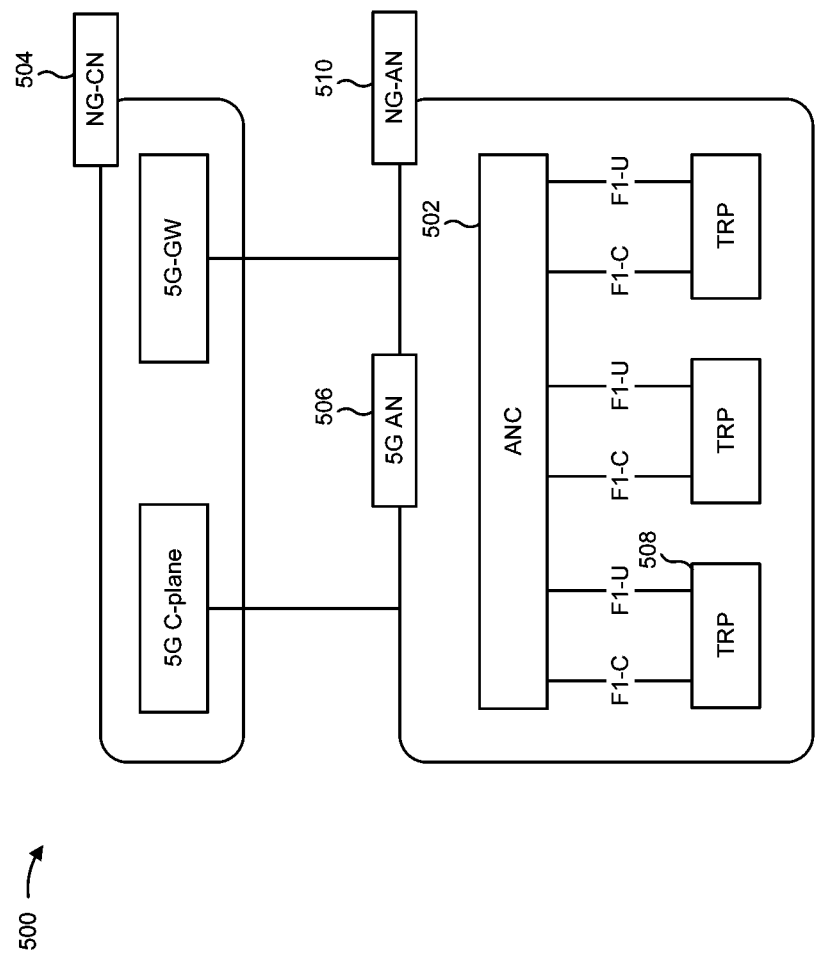
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
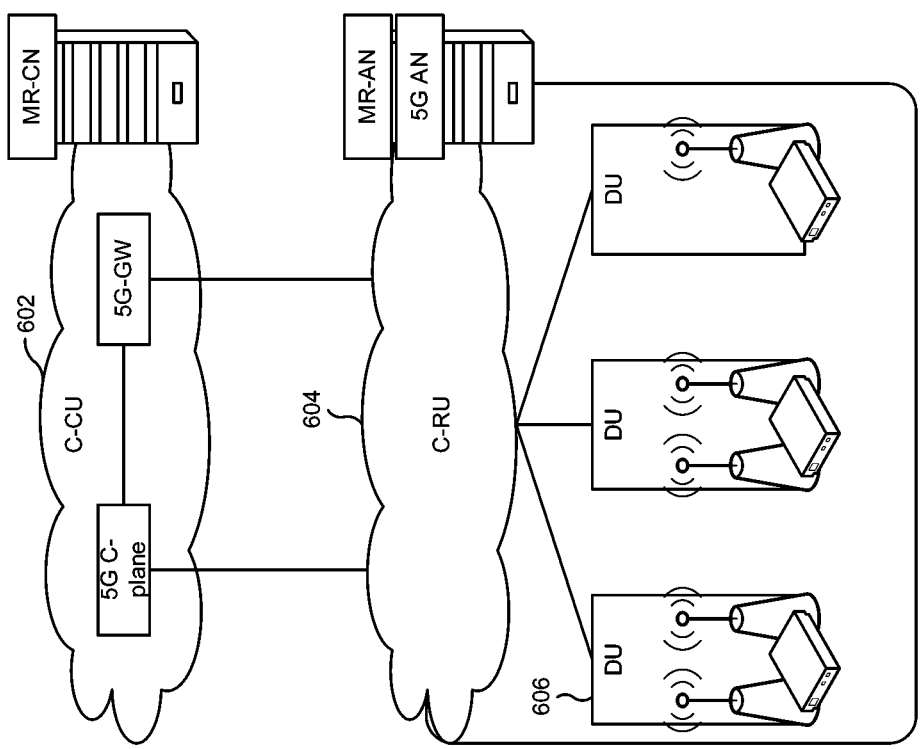
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

A wireless communication device, such as a UE or a BS, may use beamforming (e.g., analog beamforming, digital beamforming, and/or the like) to generate a directional beam (e.g., a directional transition beam, a directional receive beam, and/or the like) that may be pointed or steered in a particular spatial direction. This permits the wireless communication device to increase the signal strength of a transmission in a particular direction, which may increase the reliability of the transmission and may increase the propagation distance of the transmission.

In some cases, a wireless communication device may transmit a beamformed transmission from a single antenna panel, a single antenna array, or a single antenna using a single beamformed transmit beam. However, in some cases, a wireless communication device may be capable of transmitting a multi-beam beamformed transmission, which may be a beamformed transmission that is transmitted using a plurality of transmit beams from the same antenna panel, the same antenna array, or the same antenna. Moreover, advancements in wireless communication devices may permit a wireless communication device to be equipped with a plurality of antenna panels, antenna arrays, and/or antennas. In this case, a wireless communication device may be capable of transmitting a multi-beam beamformed transmission using a plurality of antenna panels, antenna arrays, and/or antennas, where each transmit beam is associated with a respective antenna panel, antenna array, or antenna of the wireless communication device.

A multi-beam transmission may require inter-beam combining at the transmitting wireless communication device transmitting the multi-beam transmission as well as at the receiving wireless communication device receiving the multi-beam transmission. Inter-beam combining may include determining an estimated combined beam for a plurality of beams on which a multi-beam transmission is transmitted. Aspects of determining an estimated combined beam include beam directions of the beams to be combined and inter-beam phase (e.g., the phase difference between the beams to be combined). While the directions of the beams may change with time on a relatively slow scale (e.g., over hundreds of slots), inter-beam phase may change much faster (e.g., on the order of a few slots or even from symbol to symbol) due to rapid changes in channel fading.

Some aspects described herein provide techniques and apparatuses for inter-beam phase factor tracking. In some aspects, a BS may configure an inter-beam phase factor tracking reference signal for tracking inter-beam phase changes. The inter-beam phase factor tracking reference signal may be a new reference signal that is introduced for the specific purpose of tracking inter-beam phase changes, may be another reference signal (e.g., a channel state information reference signal (CSI-RS) and/or the like) that is repurposed and transmitted at a high frequency (e.g., such that the reference signal is transmitted often enough to track rapid changes in inter-beam phase), and/or the like. The inter-beam phase factor tracking reference signal may be on-demand (e.g., may be triggered by a request for the inter-beam phase factor tracking reference signal), may be BS-configured, and/or the like.

The BS may transmit the inter-beam phase factor tracking reference signal, and a wireless communication device may perform one or more measurements of the inter-beam phase factor tracking reference signal to determine a set of inter-beam phase factors for the wireless communication device and/or a set of inter-beam phase factors for the BS. The wireless communication device may determine an estimated combined beam for the wireless communication device based at least in part on the set of inter-beam phase factors for the wireless communication device, and the BS may determine an estimated combined beam for the BS based at least in part on the set of inter-beam phase factors for the BS. In this way, the measurements of the inter-beam phase factor tracking reference signal permit the wireless communication device and the BS to more accurately track inter-beam phase changes, which increases the accuracy of the estimated combined beams determined by the wireless communication device and the BS.

FIG. 7A-7E are diagrams illustrating one or more examples 700 of inter-beam phase factor tracking, in accordance with various aspects of the present disclosure. As shown in FIGS. 7A-7E, example(s) 700 may include communication between a BS (e.g., a BS 110) and a wireless communication device. In some aspects, the BS and the wireless communication device may be included in a wireless network (e.g., wireless network 100). In some aspects, the wireless communication device may be a UE (e.g., UE 120), in which case the BS and the UE may communicate via a wireless access link. In some aspects, the wireless communication device may be another BS (e.g., BS 110), in which case the BS and the other BS may communicate via a wireless backhaul.

In some aspects, the wireless communication device and/or the BS may be capable of transmitting and/or receiving multi-beam transmissions. For example, the wireless communication device and/or the BS may be capable of performing a transmission on a plurality of beams using a single antenna panel, a single antenna array, or a single antenna. As another example, the wireless communication device and/or the BS may be capable of performing a transmission on a plurality of beams using a plurality of antenna panels, antenna arrays, and/or antennas. In this case, the BS may be a multi-panel BS or the BS may be configured to transmit from a plurality of TRPs. To transmit and/or receive multi-beam transmissions, the wireless communication device and/or the BS may be capable of performing multi-beam combining over at least two static directions (e.g., a plurality of different transmission or reception directions) or at least two beams (e.g., a plurality of different spatially directed beams) from one or more antenna panels, one or more antenna arrays, one or more antennas, and/or the like.

Figure 7A:
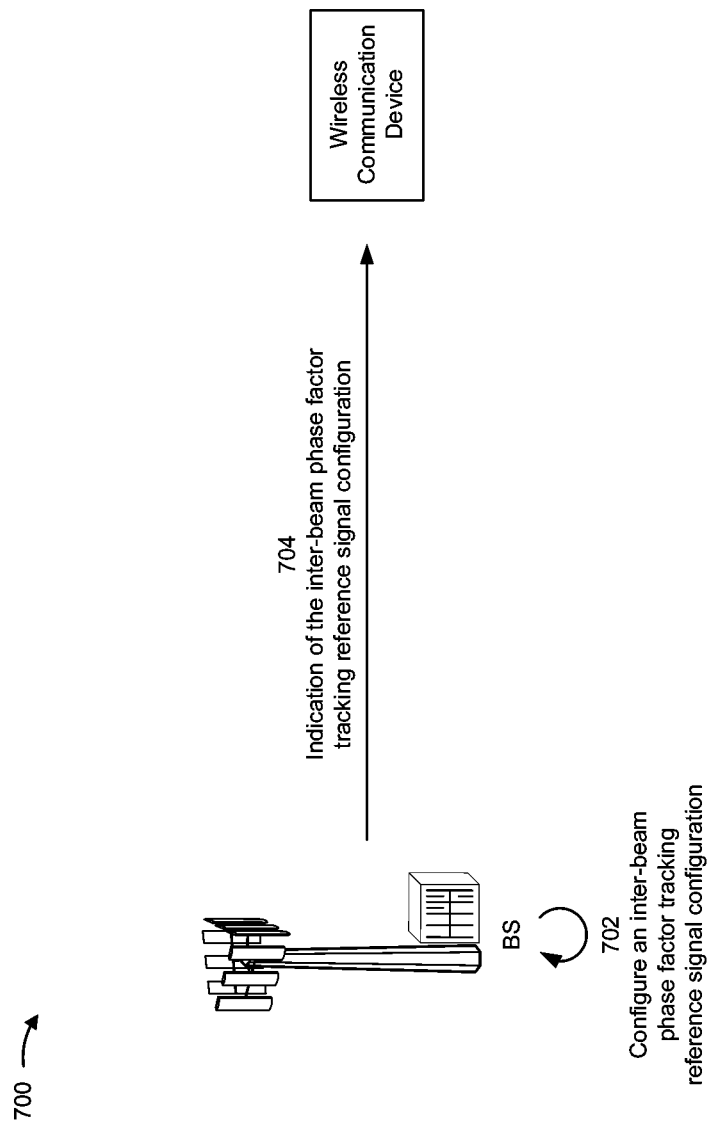
FIGS. 7A-7E are diagrams illustrating one or more examples of inter-beam phase factor tracking, in accordance with various aspects of the present disclosure.

As shown in FIG. 7A, and by reference number 702, to permit the BS and the wireless communication track inter-beam phase changes for multi-beam combining, the BS may configure an inter-beam phase factor tracking reference signal configuration. The inter-beam phase factor tracking reference signal configuration may include one or more parameters for the BS to transmit an inter-beam phase factor tracking reference signal to the wireless communication device.

In some aspects, the one or more parameters may include a periodicity of the inter-beam phase factor tracking reference signal. The periodicity may indicate that the BS is to periodically transmit the inter-beam phase factor tracking reference signal, and may indicate the period or frequency at which the BS is to periodically transmit the inter-beam phase factor tracking reference signal. In this case, the wireless communication device may perform measurements of each periodic transmission to track inter-beam phase changes.

In some aspects, the BS may configure the periodicity of the inter-beam phase factor tracking reference signal to be a short periodicity to increase granularity in tracking inter-beam phase factor tracking. For example, the BS may configure the periodicity of the inter-beam phase factor tracking reference signal such that the BS transmits the inter-beam phase factor tracking reference signal every symbol, every slot, every three slots, and/or the like. As another example, if the BS repurposes a CSI-RS for use as the inter-beam phase factor tracking reference signal, the BS may configure the inter-beam phase factor tracking reference signal with the shortest periodicity among a hierarchy of available CSI-RS periodicities.

In some aspects, the BS may configure the periodicity of the inter-beam phase factor tracking reference signal based at least in part on information received from the wireless communication device. For example, the wireless communication device may transmit, to the BS, mobility information associated with the wireless communication device (e.g., a speed and/or direction of travel of the wireless communication device, location information associated with the wireless communication device, and/or the like), and the BS may configure the periodicity of the inter-beam phase factor tracking reference signal based at least in part on the mobility information. As another example, the wireless communication device may transmit, to the BS, Doppler information associated with the wireless communication device (e.g., Doppler shift information associated with the wireless communication device), and the BS may configure the periodicity of the inter-beam phase factor tracking reference signal based at least in part on the Doppler information.

In some aspects, the BS may configure the periodicity of the inter-beam phase factor tracking reference signal based at least in part on receiving a request for a particular periodicity from the wireless communication device. In some aspects, the BS may configure the inter-beam phase factor tracking reference signal configuration such that the BS is to aperiodically or semi-persistently transmit the inter-beam phase factor tracking reference signal. In this case, the BS may transmit the inter-beam phase factor tracking reference signal based at least in part on receiving a request for an inter-beam phase factor tracking reference signal from the wireless communication device, among other examples and/or possibilities.

In some aspects, the one or more parameters may include an indication of one or more time-frequency resources in which the BS is to transmit the inter-beam phase factor tracking reference signal. For example, the inter-beam phase factor tracking reference signal configuration may identify one or more frequencies, subcarriers, component carriers, resource elements, resource blocks, symbols, slots, and/or the like in which the BS is to transmit the inter-beam phase factor tracking reference signal.

As further shown in FIG. 7A, and by reference number 704, the BS may transmit an indication of the inter-beam phase factor tracking reference signal configuration to the wireless communication device. The wireless communication device may receive the indication of the inter-beam phase factor tracking reference signal configuration and may monitor for inter-beam phase factor tracking reference signals from the BS based at least in part on the inter-beam phase factor tracking reference signal configuration.

In some aspects, if the wireless communication device is a UE, the BS may transmit an indication of the inter-beam phase factor tracking reference signal configuration in a downlink communication such as a radio resource control (RRC) communication, a medium access control control element (MAC-CE) communication, a downlink control information (DCI) communication, and/or the like. In some aspects, if the wireless communication device is another BS, the BS may transmit an indication of the inter-beam phase factor tracking reference signal configuration in an Xn interface communication, an X2 interface communication, and/or the like.

Figure 7B:
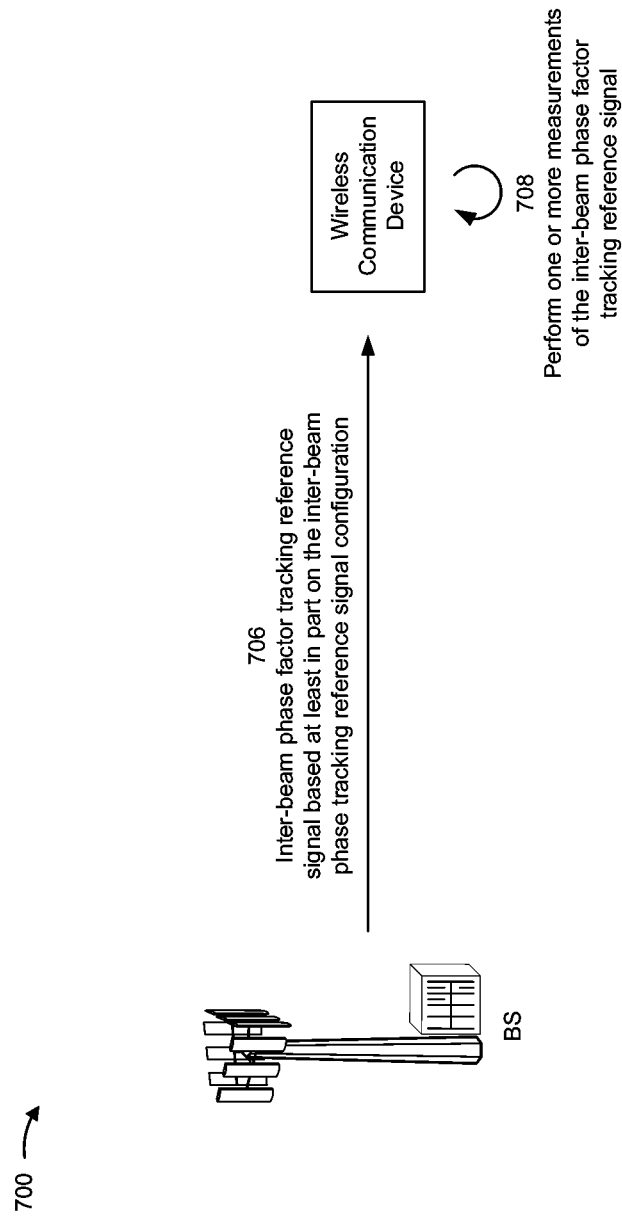

As shown in FIG. 7B, and by reference number 706, the BS may transmit an inter-beam phase factor tracking reference signal based at least in part on the inter-beam phase factor tracking reference signal configuration. For example, the BS may transmit the inter-beam phase factor tracking reference signal at the periodicity indicated in the inter-beam phase factor tracking reference signal configuration, may transmit the inter-beam phase factor tracking reference signal in the one or more time-frequency domain resources indicated in the inter-beam phase factor tracking reference signal configuration, and/or the like. In some aspects, the BS may transmit the inter-beam phase factor tracking reference signal based at least in part on receiving a request (e.g., from the wireless communication device) for the inter-beam phase factor tracking reference signal. In some aspects, the BS may transmit the inter-beam phase factor tracking reference signal on the beams on which the BS is to perform multi-beam combining and/or multi-beam transmissions.

As further shown in FIG. 7B, and by reference number 708, the wireless communication device may perform one or more measurements of the inter-beam phase factor tracking reference signal. The one or more measurements may include phase shift measurement(s), phase noise measurement(s), common phase error (CPE) measurement(s), and/or the like. As indicated above, if the inter-beam phase factor tracking reference signal configuration indicates that the BS is to periodically transmit the inter-beam phase factor tracking reference signal, the wireless communication device may perform the one or more measurements for each inter-beam phase factor tracking reference signal transmission.

Figure 7C:
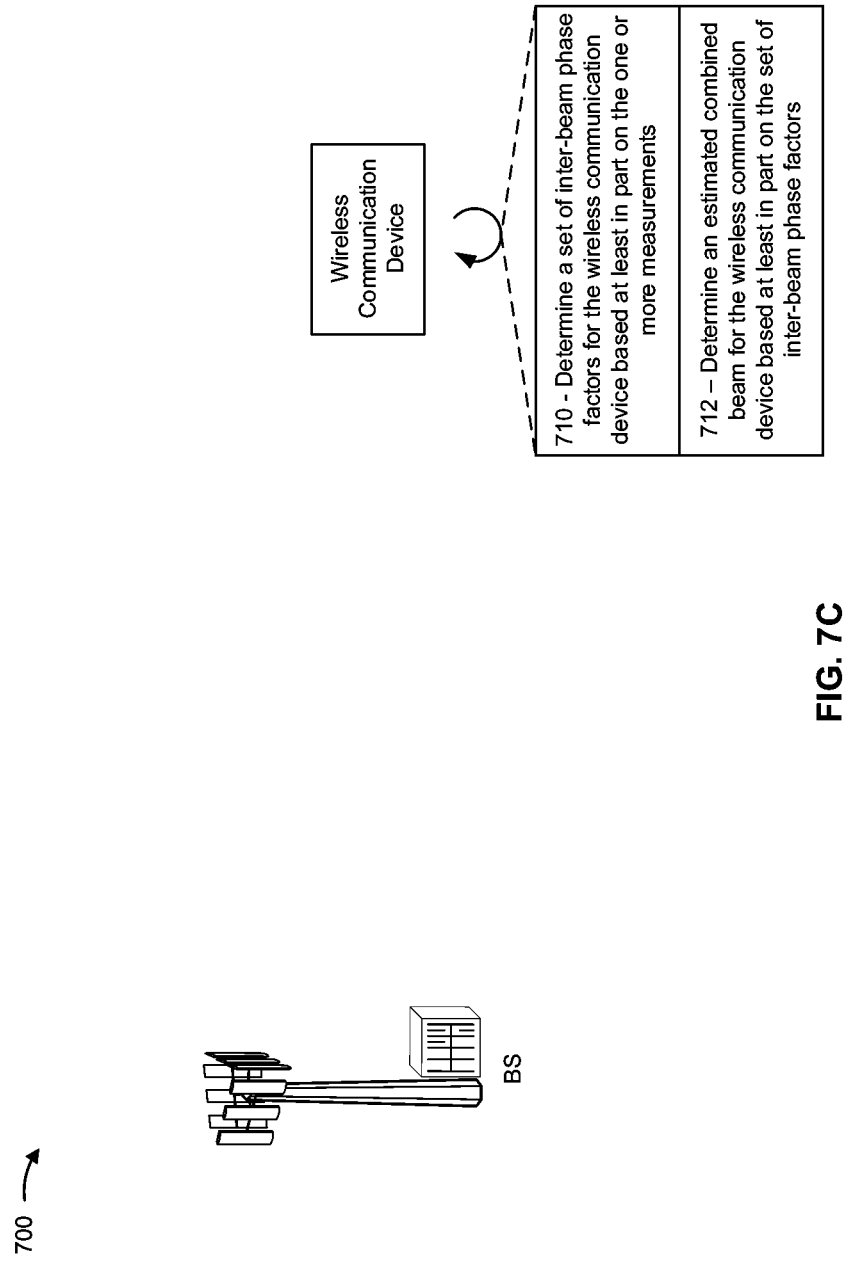

As shown in FIG. 7C, and by reference number 710, the wireless communication device may determine a set of inter-beam phase factors ($\varphi_1$) for the wireless communication device based at least in part on the one or more measurements of the inter-beam phase factor tracking reference signal (e.g., based at least in part on respective results for the one or more measurements). The wireless communication device may use the set of inter-beam phase factors to determine an estimated combined beam for a plurality of static directions or beams from one or more antenna panels, one or more antenna arrays, and/or one or more antennas of the wireless communication device.

The set of inter-beam phase factors for the wireless communication device may serve various purposes. For example, the set of multi-beam weights for multi-beam combining for the wireless communication device (e.g., beam forming weights that determine the spatial or directional aspect of the beams of the wireless communication device, indicated by $g_1$ and $g_2$, as described below) may overlap over a subset of direction(s), and optimizing over the set of inter-beam phase factors with respect to channel fading may assist in reducing and/or minimizing the loss of array gain over the overlap region. Accordingly, the wireless communication device may determine the set of inter-beam phase factors to reduce or minimize loss in array gain over the overlap region.

As another example, the wireless communication device may determine the set of inter-beam phase factors to increase or maximize the equivalent isotropically radiated power (EIRP) of the set of multi-beam weights, to reduce or minimize the peak-to-average ratio of the set of multi-beam weights, and/or the like, which reduces wasted power at the power amplifier of the wireless communication device.

In some aspects, if the wireless communication device is another BS, and the BS and the other BS communicate over a wireless backhaul, the other BS may determine the set of inter-beam phase factors to assist with polarization-based transmissions of the other BS, to compensate for environmental effects on the wireless backhaul, and/or the like.

As further shown in FIG. 7C, and by reference number 712, the wireless communication device may determine an estimated combined beam for the wireless communication device based at least in part on the set of inter-beam phase factors for the wireless communication device. The estimated combined beam may be an estimated combined beam of a set of multi-beam weights ($g_1$ and $g_2$) for multi-beam combining over a plurality of static directions and/or a plurality of beams of the wireless communication device. In some aspects, the wireless communication device may determine the estimated combined beam based at least in part on Equation 1:

$$g_{UE} = g_1 + e^{j\varphi_1} g_2 \qquad \text{Equation 1}$$

where $g_{UE}$ is the estimated combined beam for the wireless communication device, $g_1$ and $g_2$ are the set of multi-beam weights of size $M_1 * M_2 \times 1$ to be used at wireless communication device to excite the best two viable clusters over a channel from the BS (where $M_1 \times M_2$ is an element planar array), and $\varphi_1$ is the set of inter-beam phase factors for the wireless communication device.

Figure 7D:
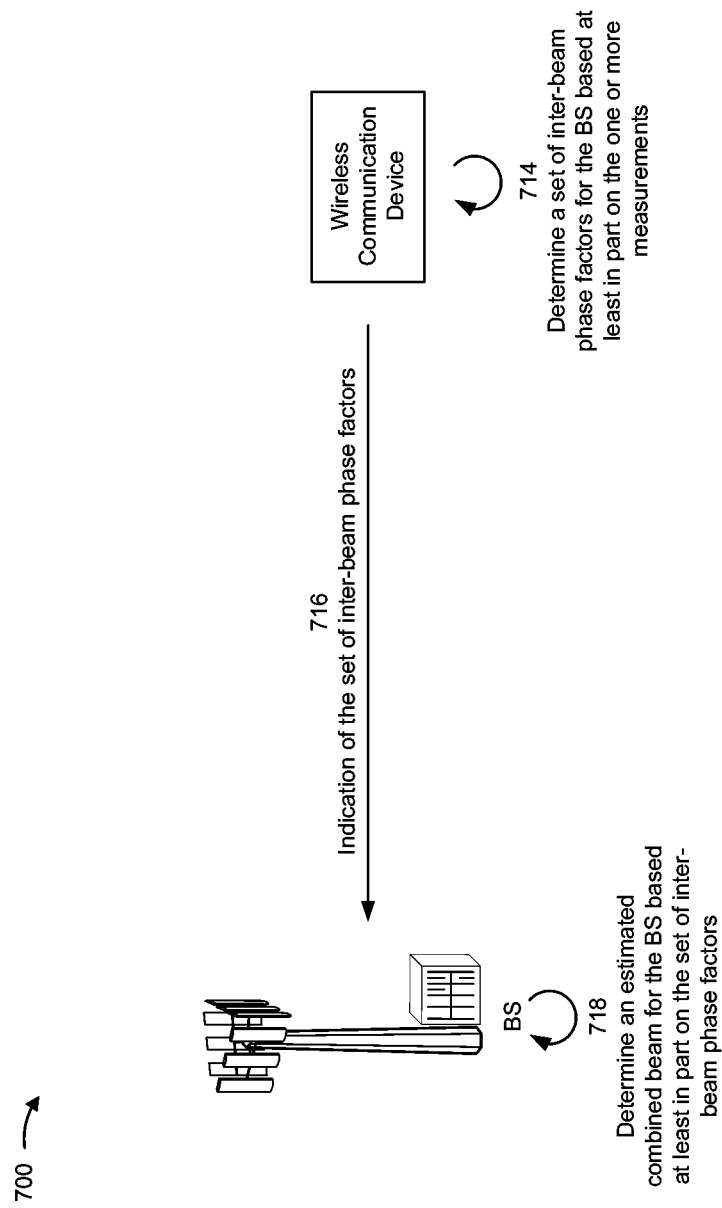

As shown in FIG. 7D, and by reference number 714, the wireless communication device may determine a set of inter-beam phase factors ($\theta_1$) for the BS based at least in part on the one or more measurements of the inter-beam phase factor tracking reference signal (e.g., based at least in part on respective results for the one or more measurements). The wireless communication device may use the set of inter-beam phase factors to determine an estimated combined beam for a plurality of static directions or beams from one or more antenna panels, one or more antenna arrays, and/or one or more antennas of the BS.

The set of inter-beam phase factors for the BS may serve various purposes. For example, the set of multi-beam weights for multi-beam combining for the BS (e.g., beam forming weights that determine the spatial or directional aspect of the beams of the BS, indicated by $f_1$ and $f_2$) may overlap over a subset of direction(s), and optimizing over the set of inter-beam phase factors with respect to channel fading may assist in reducing and/or minimizing the loss of array gain over the overlap region. Accordingly, the wireless communication device may determine the set of inter-beam phase factors to reduce or minimize loss in array gain over the overlap region. As another example, the wireless communication device may determine the set of inter-beam phase factors to increase or maximize the EIRP of the set of multi-beam weights, to reduce or minimize the peak-to-average ratio of the set of multi-beam weights, and/or the like, which reduces wasted power at the power amplifier of the BS.

As further shown in FIG. 7D, and by reference number 716, the wireless communication device may transmit, to the BS, an indication of the set of inter-beam phase factors for the BS. In some aspects, if the wireless communication device is a UE, the wireless communication device may transmit the indication of the set of inter-beam phase factors for the BS in one or more uplink control information (UCI) communications, one or more RRC communications, one or more MAC-CE communications, and/or the like. In some aspects, if the wireless communication device is another BS, the wireless communication device may transmit the indication of the set of inter-beam phase factors for the BS in one or more Xn interface communications, in one or more X2 interface communications, and/or the like.

As further shown in FIG. 7D, and by reference number 718, the BS may determine an estimated combined beam for the BS based at least in part on the set of inter-beam phase factors for the BS. The estimated combined beam may be an estimated combined beam of a set of multi-beam weights ($f_1$ and $f_2$) for multi-beam combining over a plurality of static directions and/or a plurality of beams of the BS. In some aspects, the BS may determine the estimated combined beam based at least in part on Equation 2:

$$f_{gNB} = f_1 + e^{j\theta_1} f_2 \qquad \text{Equation 2}$$

where $f_{gNB}$ is the estimated combined beam for the BS, $f_1$ and $f_2$ are the set of multi-beam weights of size $N_1 * N_2 \times 1$ to be used at the BS to excite the best two viable clusters over a channel from the BS (where $N_1 \times N_2$ is an element planar array), and $\theta_1$ is the set of inter-beam phase factors for the BS.

Figure 7E:
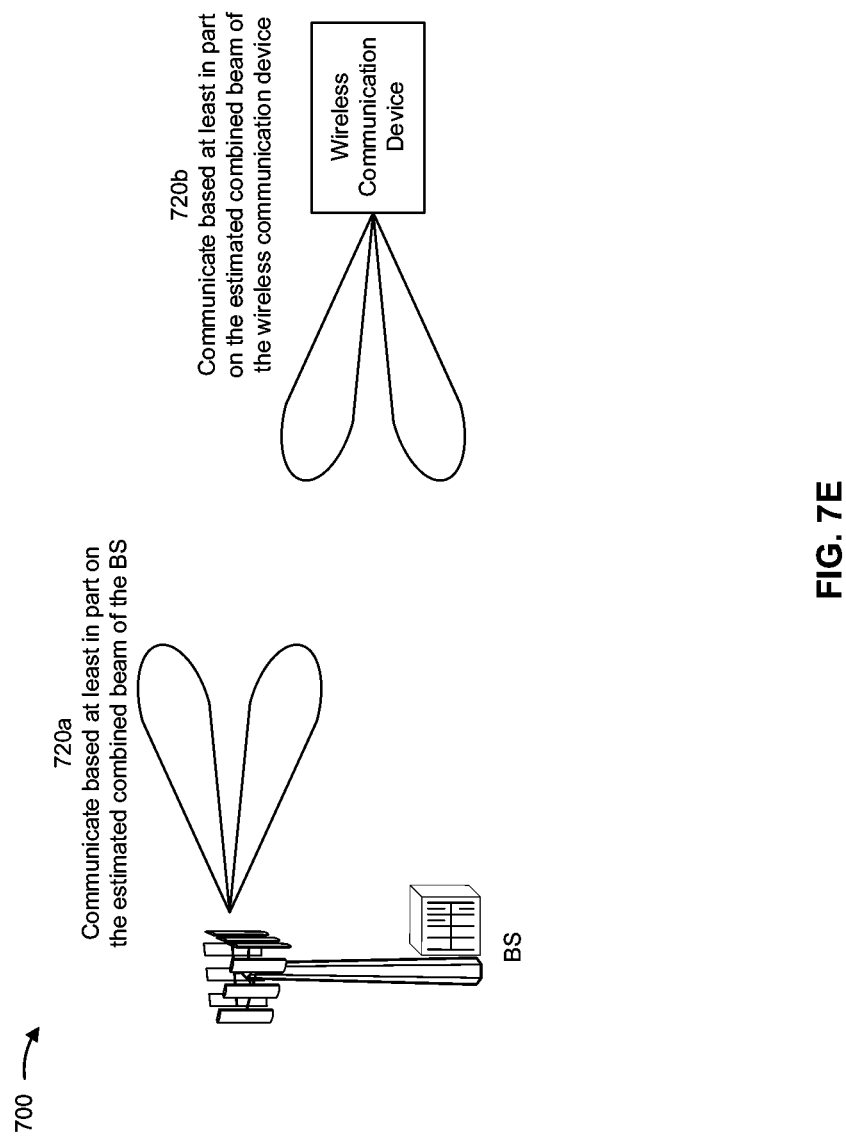

As shown in FIG. 7E, and by reference number 720, the BS may communicate with the wireless communication device using the estimated combined beam for the BS (720a) and/or the wireless communication device may communicate with the BS using the estimated combined beam for the wireless communication device (720b). As an example, the BS may perform a downlink transmission (e.g., a multi-beam downlink transmission) to the wireless communication device using the estimated combined beam for the BS, may receive an uplink transmission (e.g., a multi-beam uplink transmission) from the wireless communication device using the estimated combined beam for the BS, may transmit and/or receive backhaul communications (e.g., multi-beam backhaul communications) to and/or from the wireless communication device using the estimated combined beam for the BS, and/or the like.

As another example, the wireless communication device may perform an uplink transmission (e.g., a multi-beam uplink transmission) to the BS using the estimated combined beam for the wireless communication device, may receive a downlink transmission (e.g., a multi-beam downlink transmission) from the BS using the estimated combined beam for the wireless communication device, may transmit and/or receive backhaul communications (e.g., multi-beam backhaul communications) to and/or from the BS using the estimated combined beam for the wireless communication device, and/or the like.

In this way, the BS may configure an inter-beam phase factor tracking reference signal for tracking inter-beam phase changes. The BS may transmit the inter-beam phase factor tracking reference signal, and the wireless communication device may perform one or more measurements of the inter-beam phase factor tracking reference signal to determine a set of inter-beam phase factors for the wireless communication device and/or a set of inter-beam phase factors for the BS. The wireless communication device may determine an estimated combined beam for the wireless communication device based at least in part on the set of inter-beam phase factors for the wireless communication device, and the BS may determine an estimated combined beam for the BS based at least in part on the set of inter-beam phase factors for the BS. In this way, the measurements of the inter-beam phase factor tracking reference signal permit the wireless communication device and the BS to more accurately track inter-beam phase changes, which increases the accuracy of the estimated combined beams determined by the wireless communication device and the BS.

As indicated above, FIGS. 7A-7E are provided as one or more examples. Other examples may differ from what is described with respect to FIGS. 7A-7E.

Figure 8:
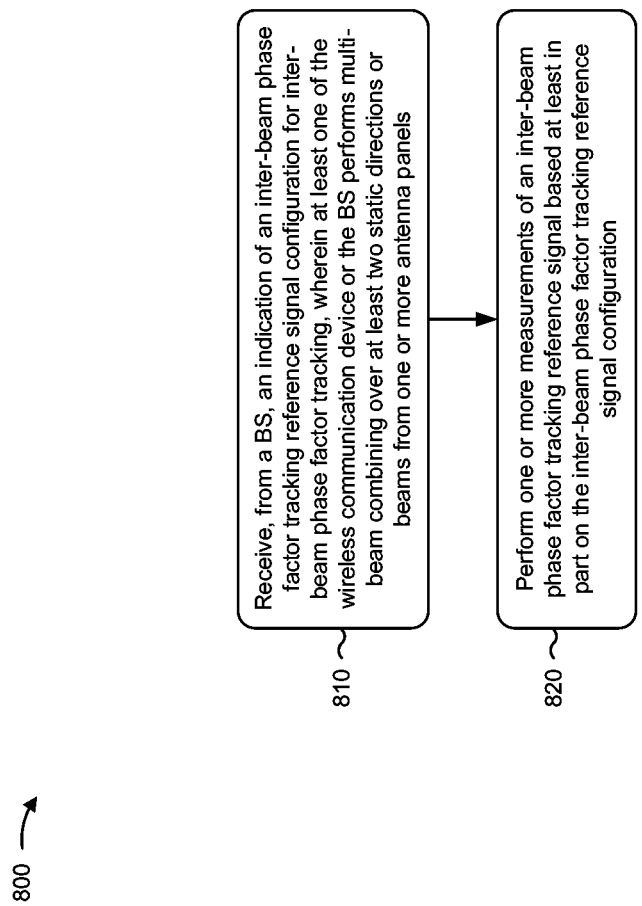
FIG. 8 is a diagram illustrating an example process performed, for example, by a UE, in accordance with various aspects of the present disclosure.

FIG. 8 is a diagram illustrating an example process 800 performed, for example, by a wireless communication device, in accordance with various aspects of the present disclosure. Example process 800 is an example where the wireless communication device (e.g., BS 110, UE 120, and/or the like) performs operations associated with inter-beam phase factor tracking.

As shown in FIG. 8, in some aspects, process 800 may include receiving, from a BS, an indication of an inter-beam phase factor tracking reference signal configuration for inter-beam phase factor tracking, wherein at least one of the wireless communication device or the BS performs multi-beam combining over at least two static directions or beams from one or more antenna panels (block 810). For example, the wireless communication device (e.g., using transmit processor 220, receive processor 238, controller/processor 240, memory 242, receive processor 258, transmit processor 264, controller/processor 280, memory 282, and/or the like) may receive, from a base station (BS), an indication of an inter-beam phase factor tracking reference signal configuration for inter-beam phase factor tracking, as described above. In some aspects, at least one of the wireless communication device or the BS performs multi-beam combining over at least two static directions or beams from one or more antenna panels.

As further shown in FIG. 8, in some aspects, process 800 may include performing one or more measurements of an inter-beam phase factor tracking reference signal based at least in part on the inter-beam phase factor tracking reference signal configuration (block 820). For example, the wireless communication device (e.g., using transmit processor 220, receive processor 238, controller/processor 240, memory 242, receive processor 258, transmit processor 264, controller/processor 280, memory 282, and/or the like) may perform one or more measurements of an inter-beam phase factor tracking reference signal based at least in part on the inter-beam phase factor tracking reference signal configuration, as described above.

Process 800 may include additional aspects, such as any single aspect or any combination of aspects described below and/or in connection with one or more other processes described elsewhere herein.

In a first aspect, the inter-beam phase factor tracking reference signal configuration indicates that the BS is to periodically transmit the inter-beam phase factor tracking reference signal, and performing one or more measurements of an inter-beam phase factor tracking reference signal comprises performing one or more measurements of each periodic transmission of the inter-beam phase factor tracking reference signal. In a second aspect, alone or in combination with the first aspect, the inter-beam phase factor tracking reference signal comprises a CSI-RS with the shortest periodicity among a hierarchy of a plurality of CSI-RS periodicities. In a third aspect, alone or in combination with one or more of the first and second aspects, the inter-beam phase factor tracking reference signal comprises a reference signal specific to inter-beam phase factor tracking.

In a fourth aspect, alone or in combination with one or more of the first through third aspects, a periodicity of the inter-beam phase factor tracking reference signal is based at least in part on at least one of mobility information associated with the wireless communication device, Doppler information associated with the wireless communication device, or a request from the wireless communication device for a particular periodicity. In a fifth aspect, alone or in combination with one or more of the first through fourth aspects, the inter-beam phase factor tracking reference signal configuration indicates that the BS is to aperiodically or semi-persistently transmit the inter-beam phase factor tracking reference signal.

In a sixth aspect, alone or in combination with one or more of the first through fifth aspects, process 800 includes determining, based at least in part on respective results of the one or more measurements of the inter-beam phase factor tracking reference signal, a set of inter-beam phase factors for the wireless communication device and determining, based at least in part on the set of inter-beam phase factors for the wireless communication device, an estimated combined beam of a set of multi-beam weights for multi-beam combining over at least two static directions or at least two beams from one or more antenna panels of the wireless communication device. In a seventh aspect, alone or in combination with one or more of the first through sixth aspects, determining the set of inter-beam phase factors for the wireless communication device comprises determining the set of inter-beam phase factors to reduce or minimize loss in array gain over an overlap region of the at least two static directions or the at least two beams at the wireless communication device.

In an eighth aspect, alone or in combination with one or more of the first through seventh aspects, determining the set of inter-beam phase factors for the wireless communication device comprises determining the set of inter-beam phase factors to increase or maximize equivalent isotropically radiated power for uplink transmissions to the BS. In a ninth aspect, alone or in combination with one or more of the first through eighth aspects, process 800 includes performing an uplink transmission to the BS using the estimated combined beam or receiving a downlink transmission from the BS using the estimated combined beam.

In a tenth aspect, alone or in combination with one or more of the first through ninth aspects, the wireless communication device comprises another BS communicatively connected with the BS via a wireless backhaul, and wherein determining the set of inter-beam phase factors for the wireless communication device comprises at least one of determining the set of inter-beam phase factors to assist with polarization-based transmissions of the other BS or determining the set of inter-beam phase factors to compensate for environmental effects on the wireless backhaul.

In an eleventh aspect, alone or in combination with one or more of the first through tenth aspects, process 800 includes determining, based at least in part on results of the one or more measurements of the inter-beam phase factor tracking reference signal, a set of inter-beam phase factors for the BS and transmitting, to the BS, an indication of the set of inter-beam phase factors. In a twelfth aspect, alone or in combination with one or more of the first through eleventh aspects, determining the set of inter-beam phase factors comprises determining, based at least in part on results of the one or more measurements of the inter-beam phase factor tracking reference signal, a set of inter-beam phase factors for the BS; transmitting, to the BS, an indication of the set of inter-beam phase factors.

In a thirteenth aspect, alone or in combination with one or more of the first through twelfth aspects, determining the set of inter-beam phase factors comprises determining the set of inter-beam phase factors to increase or maximize equivalent isotropically radiated power for downlink transmissions from the BS to the wireless communication device. In a fourteenth aspect, alone or in combination with one or more of the first through thirteenth aspects, the wireless communication device comprises a user equipment or another BS communicatively connected with the BS via a wireless backhaul.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
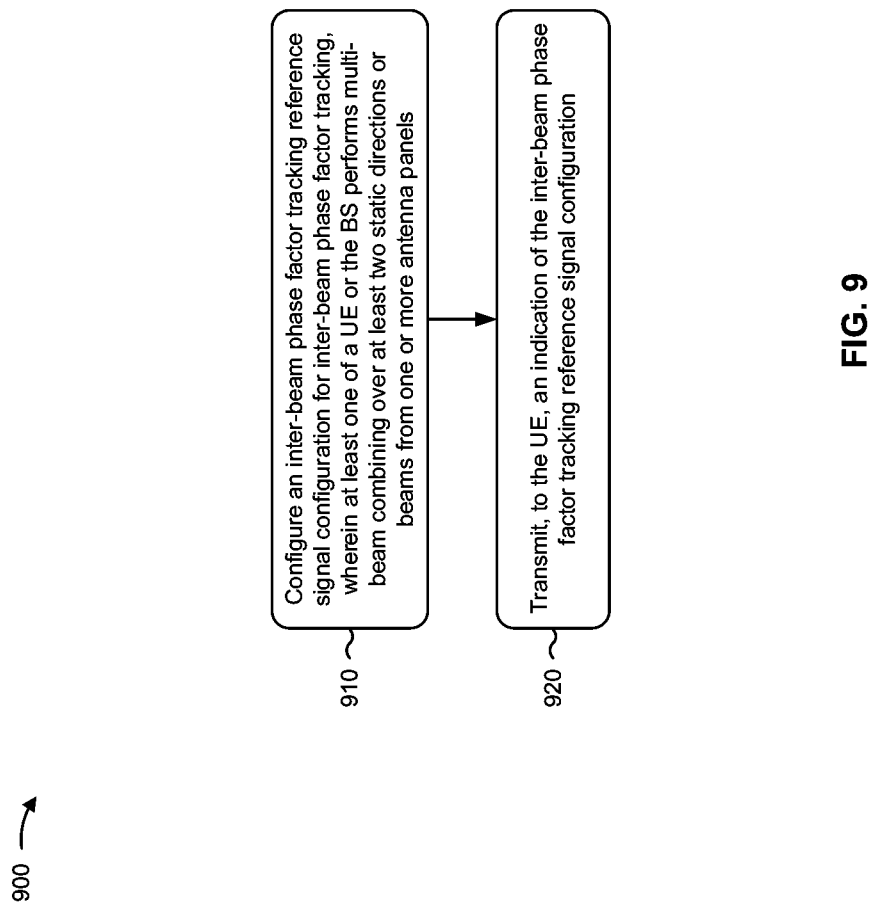
FIG. 9 is a diagram illustrating an example process performed, for example, by a BS, in accordance with various aspects of the present disclosure.

FIG. 9 is a diagram illustrating an example process 900 performed, for example, by a BS, in accordance with various aspects of the present disclosure. Example process 900 is an example where the BS (e.g., BS 110) performs operations associated with inter-beam phase factor tracking.

As shown in FIG. 9, in some aspects, process 900 may include configuring an inter-beam phase factor tracking reference signal configuration for inter-beam phase factor tracking, wherein at least one of a UE or the BS performs multi-beam combining over at least two static directions or beams from one or more antenna panels (block 910). For example, the BS (e.g., using transmit processor 220, receive processor 238, controller/processor 240, memory 242, and/ or the like) may configure an inter-beam phase factor tracking reference signal configuration for inter-beam phase factor tracking, as described above. In some aspects, at least one of a UE or the BS performs multi-beam combining over at least two static directions or beams from one or more antenna panels.

As further shown in FIG. 9, in some aspects, process 900 may include transmitting, to the UE, an indication of the inter-beam phase factor tracking reference signal configuration (block 920). For example, the BS (e.g., using transmit processor 220, receive processor 238, controller/processor 240, memory 242, and/or the like) may transmit, to the UE, an indication of the inter-beam phase factor tracking reference signal configuration, as described above.

Process 900 may include additional aspects, such as any single aspect or any combination of aspects described below and/or in connection with one or more other processes described elsewhere herein.

In a first aspect, configuring the inter-beam phase factor tracking reference signal configuration comprises configuring the inter-beam phase factor tracking reference signal configuration to indicate that the BS is to transmit an inter-beam phase factor tracking reference signal at a periodicity, and process 900 includes transmitting an inter-beam phase factor tracking reference signal at the periodicity indicated in the inter-beam phase factor tracking reference signal configuration. In a second aspect, alone or in combination with the first aspect, the inter-beam phase factor tracking reference signal comprises a CSI-RS with the shortest periodicity among a hierarchy of a plurality of CSI-RS periodicities. Ina third aspect, alone or in combination with one or more of the first and second aspects, the inter-beam phase factor tracking reference signal comprises a reference signal specific to inter-beam phase factor tracking.

In a fourth aspect, alone or in combination with one or more of the first through third aspects, a periodicity of the inter-beam phase factor tracking reference signal is based at least in part on at least one of mobility information received from the UE, Doppler information received from the UE, or a request for a particular periodicity received from the UE. In a fifth aspect, alone or in combination with one or more of the first through fourth aspects, configuring the inter-beam phase factor tracking reference signal configuration comprises configuring the inter-beam phase factor tracking reference signal configuration to indicate that the BS is to aperiodically or semi-persistently transmit the inter-beam phase factor tracking reference signal.

In a sixth aspect, alone or in combination with one or more of the first through fifth aspects, process 900 includes receiving an indication of a set of inter-beam phase factors for the BS; determining, based at least in part on the set of inter-beam phase factors, an estimated combined beam of a set of multi-beam weights for multi-beam combining over at least two static directions or at least two beams from one or more antenna panels of the BS; and performing a downlink transmission to the UE using the estimated combined beam, or receiving an uplink transmission from the UE using the estimated combined beam.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
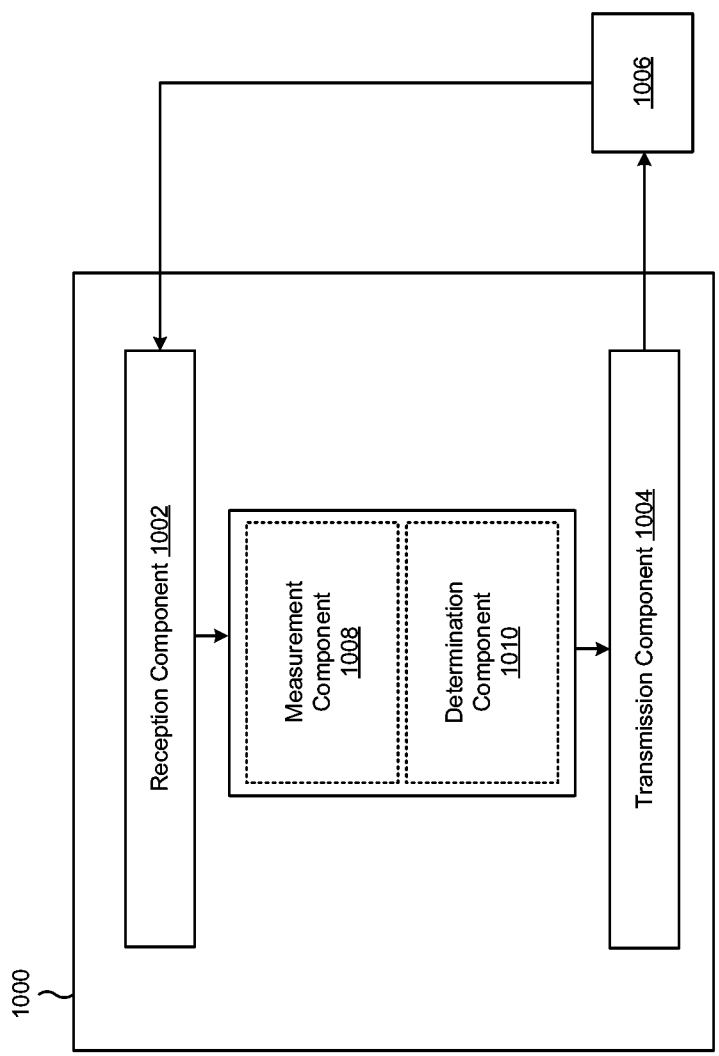
FIGS. 10 and 11 are block diagrams of example apparatuses for wireless communication, in accordance with various aspects of the present disclosure.

FIG. 10 is a block diagram of an example apparatus 1000 for wireless communication. The apparatus 1000 may be a wireless communication device, or a wireless communication device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a measurement component 1008 or a determination component 1010, among other examples.

In some aspects, the apparatus 1000 may be configured to perform one or more operations described herein in connection with FIGS. 7A-7E. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE 120 or the BS 110 described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE 120 or the BS 110 described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE 120 or the BS 110 described above in connection with FIG. 2. In some aspects, the transmission component 1004 may be co-located with the reception component 1002 in a transceiver.

The reception component 1002 may receive, from the apparatus 1006, an indication of an inter-beam phase factor tracking reference signal configuration for inter-beam phase factor tracking wherein at least one of the apparatus 1000 or the apparatus 1006 performs multi-beam combining over at least two static directions or beams from one or more antenna panels. The measurement component 1008 may perform one or more measurements of an inter-beam phase factor tracking reference signal based at least in part on the inter-beam phase factor tracking reference signal configuration. The determination component 1010 may determine, based at least in part on respective results of the one or more measurements of the inter-beam phase factor tracking reference signal, a set of inter-beam phase factors for the wireless communication device.

The determination component 1010 may determine, based at least in part on the inter-beam phase factors for the wireless communication device, an estimated combined beam of a set of multi-beam weights for multi-beam combining over at least two static directions or at least two beams from one or more antenna panels of the wireless communication device. The transmission component 1004 may perform an uplink transmission to the apparatus 1006 using the estimated combined beam. The reception component 1002 may receive a downlink transmission from the apparatus 1006 using the estimated combined beam. The determination component 1010 may determine, based at least in part on results of the one or more measurements of the inter-beam phase factor tracking reference signal, a set of inter-beam phase factors for the apparatus 1006. The transmission component 1004 may transmit, to the apparatus 1006, an indication of the set of inter-beam phase factors.

Figure 11:
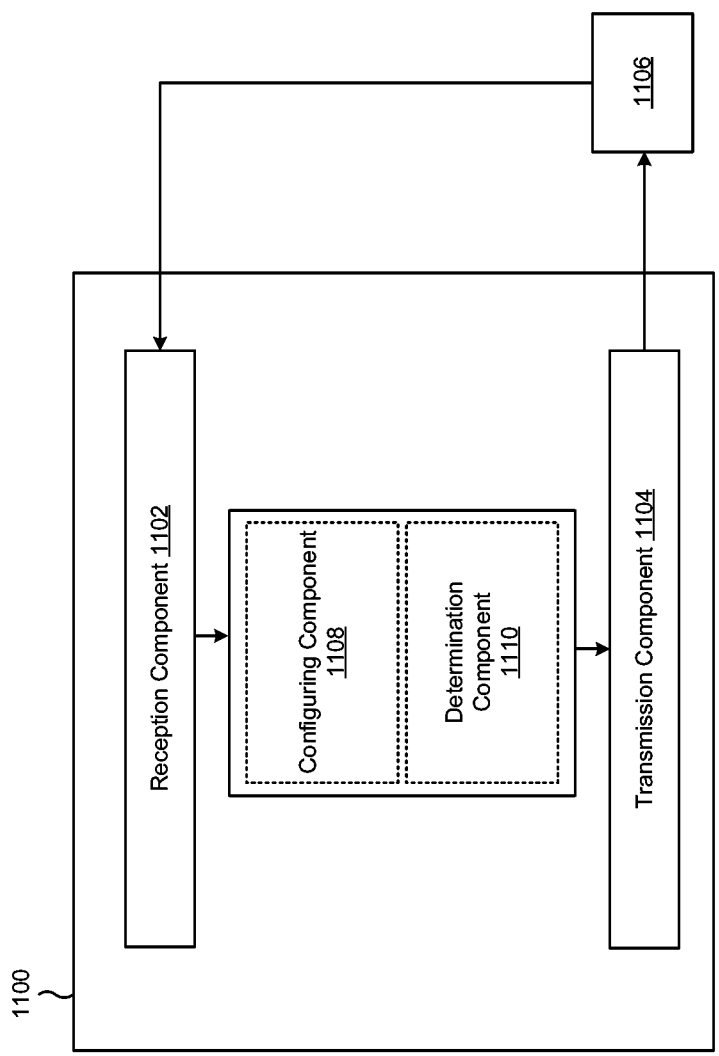

FIG. 11 is a block diagram of an example apparatus 1100 for wireless communication. The apparatus 1100 may be a BS, or a BS may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a configuring component 1108 or a determination component 1110, among other examples.

In some aspects, the apparatus 1100 may be configured to perform one or more operations described herein in connection with FIGS. 7A-7E. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the BS described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the BS described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the BS described above in connection with FIG. 2. In some aspects, the transmission component 1104 may be co-located with the reception component 1102 in a transceiver.

The configuring component 1108 may configure an inter-beam phase factor tracking reference signal configuration for inter-beam phase factor tracking wherein at least one of the apparatus 1106 or the apparatus 1100 performs multi-beam combining over at least two static directions or beams from one or more antenna panels. The transmission component 1104 may transmit, to the apparatus 1106, an indication of the inter-beam phase factor tracking reference signal configuration.

The reception component 1102 may receive an indication of a set of inter-beam phase factors for the apparatus 1100. The determination component 1110 may determine, based at least in part on the set of inter-beam phase factors, an estimated combined beam of a set of multi-beam weights for multi-beam combining over at least two static directions or at least two beams from one or more antenna panels of the apparatus 1100. The transmission component 1104 may perform a downlink transmission to the apparatus 1106 using the estimated combined beam receiving an uplink transmission from the apparatus 1106 using the estimated combined beam.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
receiving, from a base station (BS), an indication of an inter-beam phase factor tracking reference signal configuration for inter-beam phase factor tracking;
performing one or more measurements of an inter-beam phase factor tracking reference signal based at least in part on the inter-beam phase factor tracking reference signal configuration, the inter-beam phase factor tracking reference signal comprising a reference signal with a shortest periodicity among a hierarchy of a plurality of reference signal periodicities, wherein the inter-beam phase factor tracking reference signal comprises a channel state information reference signal (CSI-RS), and wherein the hierarchy of the plurality of periodicities comprises a plurality of CSI-RS periodicities; and
determining, based at least in part on respective results of the one or more measurements of the inter-beam phase factor tracking reference signal, an estimated combined beam for multi-beam combining (i) over at least two static directions or (ii) over at least two beams from one or more antenna panels.

2. The method of claim 1, wherein the inter-beam phase factor tracking reference signal configuration indicates that the BS is to periodically transmit the inter-beam phase factor tracking reference signal; and
wherein performing the one or more measurements of an inter-beam phase factor tracking reference signal comprises:
performing one or more measurements of each periodic transmission of the inter-beam phase factor tracking reference signal.

3. The method of claim 1, wherein the reference signal with the shortest periodicity comprises:
a reference signal specific to inter-beam phase factor tracking.

4. The method of claim 1, wherein the periodicity of the inter-beam phase factor tracking reference signal is based at least in part on at least one of:
mobility information associated with the wireless communication device,
Doppler information associated with the wireless communication device, or
a request from the wireless communication device for a particular periodicity.

5. The method of claim 1, wherein the inter-beam phase factor tracking reference signal configuration indicates that the BS is to aperiodically or semi-persistently transmit the inter-beam phase factor tracking reference signal.

6. The method of claim 1, wherein determining the estimated combined beam comprises:
    determining, based at least in part on the respective results of the one or more measurements of the inter-beam phase factor tracking reference signal, a set of inter-beam phase factors for the wireless communication device; and
    determining, based at least in part on the set of inter-beam phase factors for the wireless communication device, the estimated combined beam of a set of multi-beam weights for the multi-beam combining.

7. The method of claim 6, wherein determining the set of inter-beam phase factors for the wireless communication device comprises:
    determining the set of inter-beam phase factors to reduce or minimize loss in array gain over an overlap region of the at least two static directions or the at least two beams at the wireless communication device.

8. The method of claim 6, wherein determining the set of inter-beam phase factors for the wireless communication device comprises:
    determining the set of inter-beam phase factors to increase or maximize equivalent isotropically radiated power for uplink transmissions to the BS.

9. The method of claim 6, further comprising:
    performing an uplink transmission to the BS using the estimated combined beam, or
    receiving a downlink transmission from the BS using the estimated combined beam.

10. The method of claim 6, wherein the wireless communication device comprises:
    another BS communicatively connected with the BS via a wireless backhaul; and
    wherein determining the set of inter-beam phase factors for the wireless communication device comprises at least one of:
        determining the set of inter-beam phase factors to assist with polarization-based transmissions of the other BS, or
        determining the set of inter-beam phase factors to compensate for environmental effects on the wireless backhaul.

11. The method of claim 1, further comprising:
    determining, based at least in part on results of the one or more measurements of the inter-beam phase factor tracking reference signal, a set of inter-beam phase factors for the BS; and
    transmitting, to the BS, an indication of the set of inter-beam phase factors.

12. The method of claim 11, wherein determining the set of inter-beam phase factors comprises:
    determining the set of inter-beam phase factors to reduce or minimize loss in array gain over an overlap region of the at least two static directions or the at least two beams at the BS.

13. The method of claim 11, wherein determining the set of inter-beam phase factors comprises:
    determining the set of inter-beam phase factors to increase or maximize equivalent isotropically radiated power for downlink transmissions from the BS to the wireless communication device.

14. The method of claim 1, wherein the wireless communication device comprises:
    a user equipment, or
    another BS communicatively connected with the BS via a wireless backhaul.

15. A method of wireless communication performed by a base station (BS), comprising:
    configuring an inter-beam phase factor tracking reference signal configuration for inter-beam phase factor tracking;
    transmitting, to a user equipment (UE), an indication of the inter-beam phase factor tracking reference signal configuration;
    transmitting an inter-beam phase factor tracking reference signal based at least in part on the inter-beam phase factor tracking reference signal configuration, the inter-beam phase factor tracking reference signal comprising a reference signal with a shortest periodicity among a hierarchy of a plurality of reference signal periodicities, wherein the inter-beam phase factor tracking reference signal comprises a channel state information reference signal (CSI-RS), and
    wherein the hierarchy of the plurality of periodicities comprises a plurality of CSI-RS periodicities;
    receiving an indication of a set of inter-beam phase factors associated with one or more measurements of the inter-beam phase factor tracking reference signal; and
    determining, based at least in part on the set of inter-beam phase factors, an estimated combined beam for multi-beam combining (i) over at least two static directions or (ii) over at least two beams from one or more antenna panels.

16. The method of claim 15, wherein configuring the inter-beam phase factor tracking reference signal configuration comprises:
    configuring the inter-beam phase factor tracking reference signal configuration to indicate that the BS is to transmit the inter-beam phase factor tracking reference signal at a periodicity corresponding to the shortest periodicity among the hierarchy of the plurality of reference signal periodicities; and
    wherein transmitting the inter-beam phase factor tracking reference signal comprises:
        transmitting the inter-beam phase factor tracking reference signal at the periodicity indicated in the inter-beam phase factor tracking reference signal configuration.

17. The method of claim 15, wherein the reference signal with the shortest periodicity comprises:
    a reference signal specific to inter-beam phase factor tracking.

18. The method of claim 15, wherein the periodicity of the inter-beam phase factor tracking reference signal is based at least in part on at least one of:
    mobility information received from the UE,
    Doppler information received from the UE, or
    a request for a particular periodicity received from the UE.

19. The method of claim 15, wherein configuring the inter-beam phase factor tracking reference signal configuration comprises:
    configuring the inter-beam phase factor tracking reference signal configuration to indicate that the BS is to aperiodically or semi-persistently transmit the inter-beam phase factor tracking reference signal.

20. The method of claim 15, further comprising:
    performing a downlink transmission to the UE using the estimated combined beam, or receiving an uplink transmission from the UE using the estimated combined beam.

21. A wireless communication device for wireless communication, comprising:
one or more memories; and
one or more processors coupled with the one or more memories and configured to cause the wireless communication device to:
receive, from a base station (BS), an indication of an inter-beam phase factor tracking reference signal configuration for inter-beam phase factor tracking;
perform one or more measurements of an inter-beam phase factor tracking reference signal based at least in part on the inter-beam phase factor tracking reference signal configuration, the inter-beam phase factor tracking reference signal comprising a reference signal with a shortest periodicity among a hierarchy of a plurality of reference signal periodicities, wherein the inter-beam phase factor tracking reference signal comprises a channel state information reference signal (CSI-RS), and wherein the hierarchy of the plurality of periodicities comprises a plurality of CSI-RS periodicities; and
determine, based at least in part on respective results of the one or more measurements of the inter-beam phase factor tracking reference signal, an estimated combined beam for multi-beam combining (i) over at least two static directions or (ii) over at least two beams from one or more antenna panels.

22. The wireless communication device of claim 21, wherein the inter-beam phase factor tracking reference signal configuration indicates that the BS is to periodically transmit the inter-beam phase factor tracking reference signal; and
wherein the one or more processors, when performing the one or more measurements of an inter-beam phase factor tracking reference signal, are configured to cause the wireless communication device to:
perform one or more measurements of each periodic transmission of the inter-beam phase factor tracking reference signal.

23. The wireless communication device of claim 21, wherein the one or more processors, when determining the estimated combined beam, are configured to cause the wireless communication device to:
determine, based at least in part on the respective results of the one or more measurements of the inter-beam phase factor tracking reference signal, a set of inter-beam phase factors for the wireless communication device; and
determine, based at least in part on the set of inter-beam phase factors for the wireless communication device, the estimated combined beam of a set of multi-beam weights for the multi-beam combining.

24. The wireless communication device of claim 21, wherein the one or more processors are further configured to cause the wireless communication device to:
determine, based at least in part on results of the one or more measurements of the inter-beam phase factor tracking reference signal, a set of inter-beam phase factors for the BS; and
transmit, to the BS, an indication of the set of inter-beam phase factors.

25. A base station (BS) for wireless communication, comprising:
one or more memories; and
one or more processors coupled with the one or more memories and configured to cause the BS to:
configure an inter-beam phase factor tracking reference signal configuration for inter-beam phase factor tracking;
transmit, to a user equipment (UE), an indication of the inter-beam phase factor tracking reference signal configuration;
transmit an inter-beam phase factor tracking reference signal based at least in part on the inter-beam phase factor tracking reference signal configuration, the inter-beam phase factor tracking reference signal comprising a reference signal with a shortest periodicity among a hierarchy of a plurality of reference signal periodicities, wherein the inter-beam phase factor tracking reference signal comprises a channel state information reference signal (CSI-RS), and wherein the hierarchy of the plurality of periodicities comprises a plurality of CSI-RS periodicities;
receive an indication of a set of inter-beam phase factors associated with one or more measurements of the inter-beam phase factor tracking reference signal; and
determine, based at least in part on the set of inter-beam phase factors, an estimated combined beam for multi-beam combining (i) over at least two static directions or (ii) over at least two beams from one or more antenna panels.

26. The BS of claim 25, wherein the one or more processors, when configuring the inter-beam phase factor tracking reference signal configuration, are configured to cause the BS to:
configure the inter-beam phase factor tracking reference signal configuration to indicate that the BS is to transmit an inter-beam phase factor tracking reference signal at a periodicity corresponding to the shortest periodicity among the hierarchy of the plurality of reference signal periodicities; and
wherein the one or more processors, when transmitting the inter-beam phase factor tracking reference signal, are configured to cause the BS to:
transmit the inter-beam phase factor tracking reference signal at the periodicity indicated in the inter-beam phase factor tracking reference signal configuration.

27. The BS of claim 25, wherein the one or more processors, when configuring the inter-beam phase factor tracking reference signal configuration, are configured to cause the BS to:
configure the inter-beam phase factor tracking reference signal configuration to indicate that the BS is to aperiodically or semi-persistently transmit an inter-beam phase factor tracking reference signal.

28. The BS of claim 25, wherein the one or more processors are further configured to cause the BS to:
perform a downlink transmission to the UE using the estimated combined beam, or
receive an uplink transmission from the UE using the estimated combined beam.

29. The BS of claim 25, wherein the set of inter-beam phase factors is associated with reducing loss in array gain over an overlap region of the at least two static directions.

30. The BS of claim 29, wherein the set of inter-beam phase factors is associated with maximizing equivalent isotropically radiated power for uplink transmissions to the BS.

* * * * *